Figure 1:
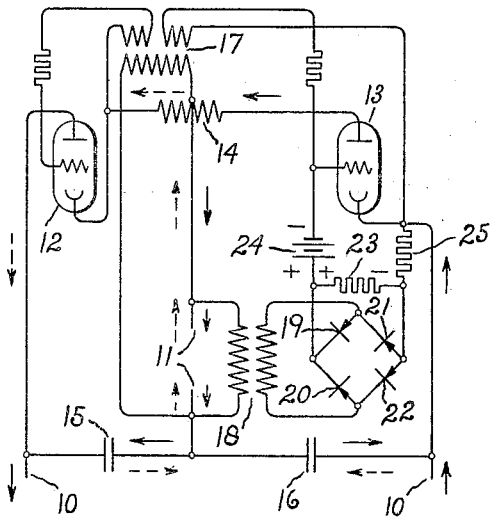

May 9, 1933.  C. A. SABBAH  1,907,589
POWER CONVERTING APPARATUS
Filed Feb. 24, 1930  4 Sheets-Sheet 1

Inventor:
Camil A. Sabbah,
by Charles E. Tullar
His Attorney.

May 9, 1933. C. A. SABBAH 1,907,589
POWER CONVERTING APPARATUS
Filed Feb. 24, 1930 4 Sheets-Sheet 4

Inventor:
Camil A. Sabbah,
by Charles W. Fuller
His Attorney.

Patented May 9, 1933

1,907,589

UNITED STATES PATENT OFFICE

CAMIL A. SABBAH, OF SCHENECTADY, NEW YORK, ASSIGNOR TO GENERAL ELECTRIC COMPANY, A CORPORATION OF NEW YORK

POWER CONVERTING APPARATUS

Application filed February 24, 1930. Serial No. 430,735.

My invention relates to power converting apparatus such as that utilized to transmit electric power between direct and alternating current circuits or between alternating current circuits operated at different frequencies, and has for its principal object the provision of an improved power converting apparatus and method of operation whereby commutation of the converted current is simplified and the converting apparatus is protected from injury due to abnormal electrical conditions of the circuits with which it is interconnected.

The present invention is similar in some respects to those disclosed by my prior applications, Ser. No. 315,577 which was filed October 27, 1928 and Ser. No. 376,828 which was filed July 8, 1929. Like the inventions disclosed by the aforesaid applications, it involves the provision of a plurality of electric discharge and inductance elements so arranged as to permit the interchange of electric power between alternating and direct current circuits. Unlike these prior inventions, it includes means for protecting the apparatus from injury due to abnormal conditions of the direct and alternating current circuits and avoids the need of capacitors for effecting commutation of the converted current.

Various apparatus, including electric discharge devices of the vapor electric and other suitable types, have been provided in the past for transmitting electric power between alternating and direct current circuits. In many of these apparatus the transmitted current is carried successively by different discharge devices or by different discharge device elements. The phenomenon whereby the current is transferred from one discharge device to another or from one discharge device element to another at the proper instant of time is commonly known as commutation.

It is well known that commutation may be effected by capacitors so arranged as to produce during the current transmitting period of one discharge path a counter electromotive force whereby current is readily started through the discharge path which transmits the current during the next successive time interval or transmitting period. This method of commutation, however, involves the provision of one or more capacitors and has the disadvantage that it complicates the apparatus and increases its cost. In accordance with my invention, this difficulty is avoided by so arranging the inductance elements of the apparatus that they effect the successive transfer of the current from one discharge path to another.

Another difficulty encountered in the operation of many of the power converting apparatus heretofore provided is short circuiting of the direct or alternating current circuit due to defective operation of the discharge devices or other causes. In accordance with my invention, means are provided for interrupting the operation of the converting apparatus in response to short circuit or other abnormal electrical conditions of the circuits with which it is connected.

My invention will be better understood from the following description when considered in connection with the accompanying drawings, and its scope will be pointed out in the appended claims.

Figure 2:
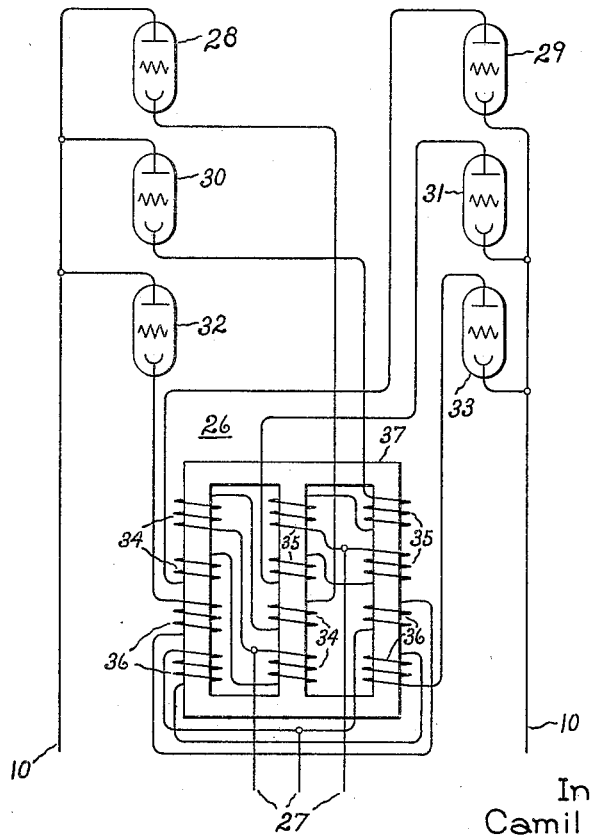
Figure 3:
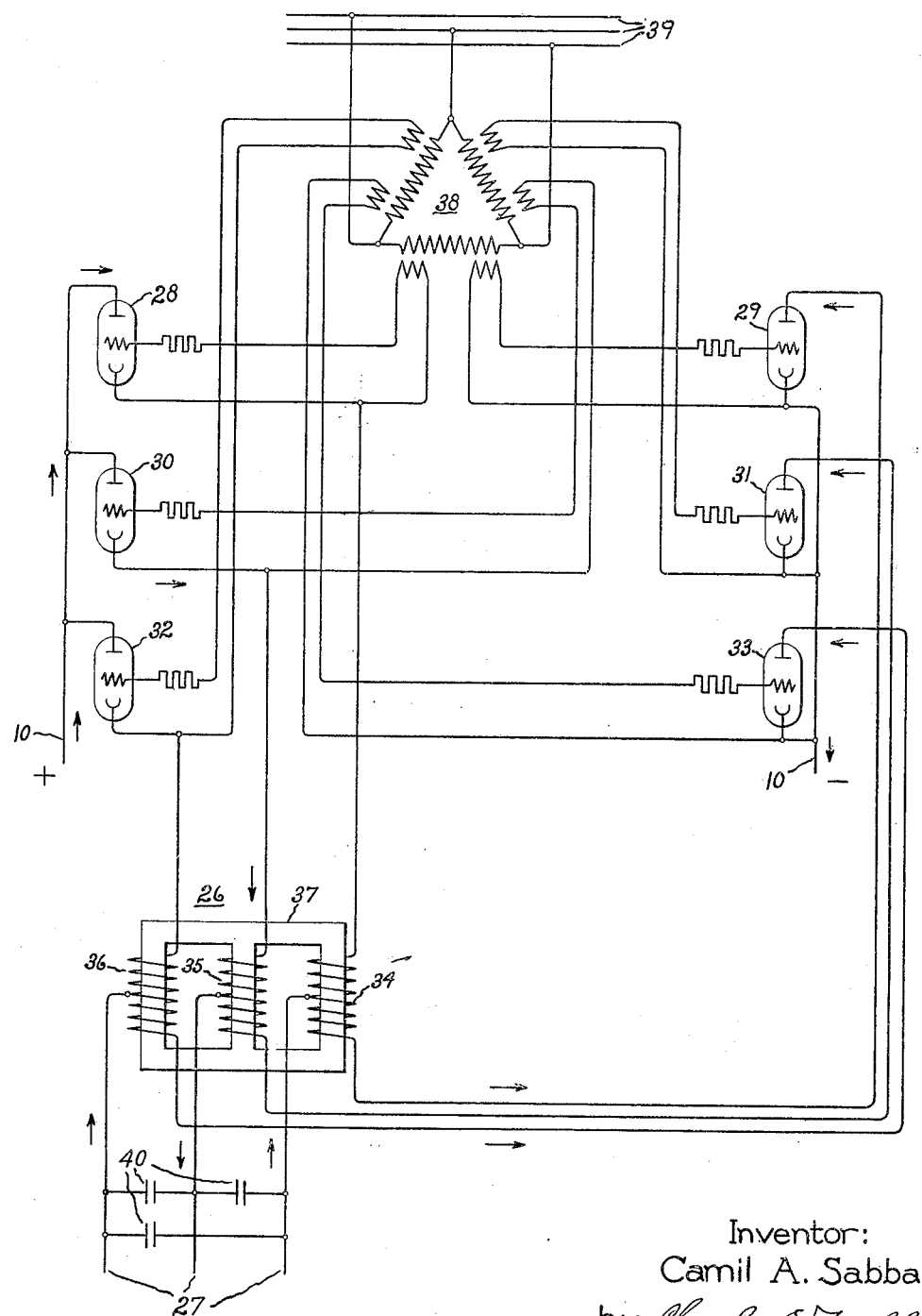
Figure 4:
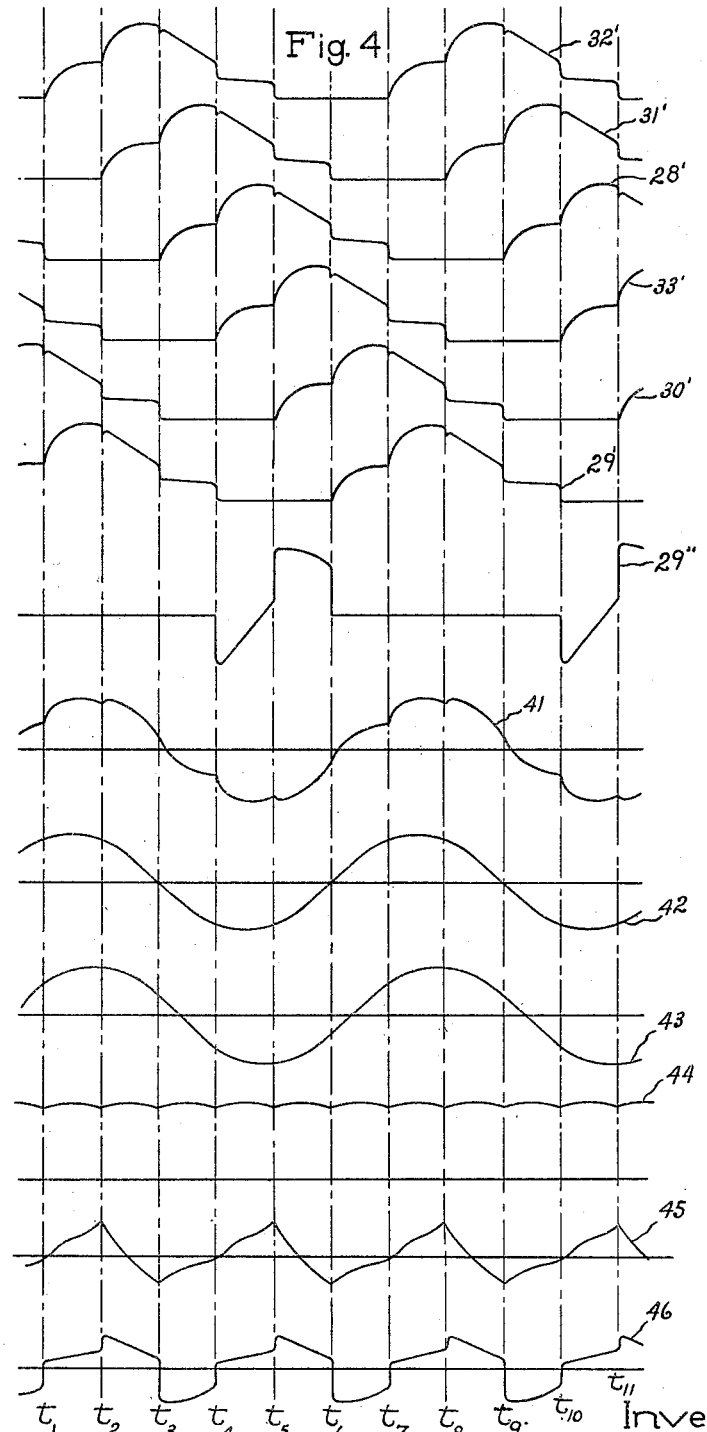
Figure 5:
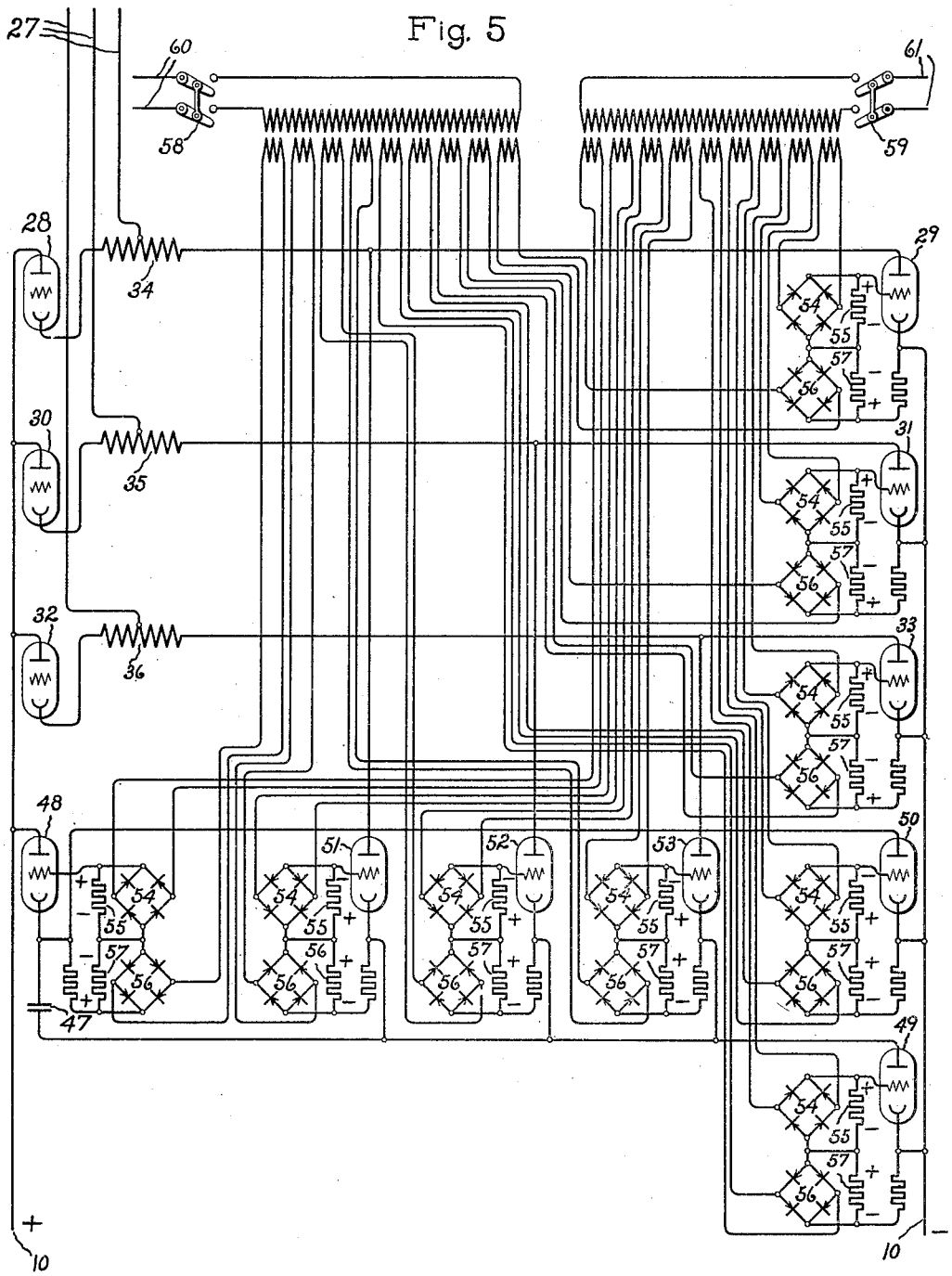

Referring to the drawings, Fig. 1 is a wiring diagram of a single phase power converting apparatus which is similar to that disclosed by Fig. 4 of my prior application Serial No. 376,828, but differs therefrom in that it includes means for interrupting its operation in case of abnormal electrical conditions on the circuits with which it is connected. Figs. 2 and 3 are wiring diagrams of polyphase apparatus wherein the inductance elements are so arranged as to effect commutation of the converted current; Fig. 4 is a series of curves relating to the operation of the apparatus illustrated by Figs. 2 and 3; and Fig. 5 is a wiring diagram illustrating the application of protective means similar to that of Fig. 1 to the polyphase apparatus of Figs. 2 and 3.

In the apparatus of Fig. 1, electric power is transmitted between direct current terminals 10 and alternating current terminals 11 through means including a pair of electric discharge devices 12 and 13, an inductance element or interphase transformer 14 connected between these devices, and a pair of capacitors 15 and 16 connected between the direct current terminals 10. It will be noted that the alternating current terminals 11 are connected respectively to a terminal intermediate the ends of the inductance element 14 and to a terminal located between the capacitance elements 15 and 16; that a transformer 17 is connected to the alternating current terminals 11 for the purpose of applying control potential to the grids or control electrodes of the devices 12 and 13; and that means including a like transformer 18 are provided for making the grid potential of the device 13 also responsive to change in the electrical conditions of an alternating current circuit to which the terminals 11 are connected.

The group of elements which cooperate to vary the grid potential of the device 13 includes a bridge circuit formed by a plurality of rectifying elements 19 to 22. The transformer 18 is connected to the alternating current terminals of the bridge circuit. A resistance element 23 is connected in shunt to the direct current terminals of the bridge circuit and a bias potential source 24 and resistance element 25 are connected in the grid circuit of the device 13 in series with the resistance element 23.

Under conditions of normal operation, current is successively transmitted through the apparatus as indicated by the full line arrows and broken line arrows, the full line arrows indicating the current transmitted through the device 13 during one interval of time and the broken arrows indicating the current transmitted through the valve 12 during the next successive interval of time. Shifting of the current from one of the valves to the other is largely effected by the capacitance elements 15 and 16 which are successively charged and discharged through the different devices as indicated. During the idle or non-transmitting period of each device, the starting of current through it is prevented by a negative potential applied to its grid through the transformer 17.

During normal operation of the apparatus, the potentials of the source 24 and the resistance element 23 are balanced, and the grid or input circuit potential of the device 13 is derived altogether from the transformer 17. If the voltage between the alternating current terminals 11 decreases to a sufficiently low value, the voltage of the source 24 predominates, a negative potential is applied to the input circuit of device 13 and the current of this device is interrupted. Under these conditions, operation of the apparatus is interrupted and no power is transmitted between the alternating and direct current circuits until the cause of this abnormally low voltage condition has been removed.

The capacitors 15 and 16 function to cause commutation of the converted current. The same result may be produced by a system of inductances and mutual inductances arranged to offer zero impedance at the instant of current transfer. When such a system is provided with means for neutralizing the effect of the leakage reactance of the inductances, it functions in substantially the same manner as the capacitators 15 and 16.

Under these conditions, the commutating system of the apparatus includes (1) the electric discharge devices, (2) the inductance elements so arranged as to apply a negative potential to the devices at the desired instant, and (3) a grid or control electrode whereby starting of current through the device is delayed for the desired time interval.

Such a system can be equivalent to a commutator only when the current of the discharge device is decreased to zero definitely by the inductive surge and is kept at zero by the grid. The current must not be prolonged by any impedance and the grid must have a sufficiently high negative potential at the moment of commutation. The grid potential should, therefore, be of rectangular wave form and the leakage reactance of the interphase transformer 14 should be decreased to zero.

The polyphase apparatus illustrated by Figs. 2 and 3 include pairs of electric discharge devices connected between the direct current terminals 10 through an inductance element or interphase transformer 26 which is provided with polyphase alternating current terminals 27. In these arrangements, the pairs of electric discharge elements 28—29, 30—31 and 32—33 are equal in number to the number of phases in the alternating current circuit. Between the devices of each pair is connected a winding similar to the winding 14 of Fig. 1, and these various windings are so wound on a single core member as to effect commutation in the same way as the capacitors 15 and 16 of Fig. 1.

The windings of the inductance device or interphase transformer 26 may be arranged in various ways. Thus in the arrangement of Fig. 2 each of the windings 34, 35 and 36 includes a plurality of coils wound on different legs of a magnetic core 37 while Fig. 3 shows an arrangement wherein the windings 34, 35 and 36 are each wound on a separate core leg.

Control potential is applied to the control electrodes or grids of the devices 28 to 33 through a transformer 38 (see Fig. 3) from polyphase buses 39 which may be connected to the alternating current terminals 27. Operation of the apparatus may be initiated by temporarily connecting these terminals to a polyphase source. A capacitor 40 is connected between the different phase terminals 27 for the purpose of neutralizing the effect of the magnetizing current of the device 26 and improving the wave form of the alternating potential.

In the operation of the apparatus illustrated by Figs. 2 and 3 at unity power factor, it has been conclusively demonstrated that no current is carried by capacitors connected between the direct current terminals 10 of this apparatus. This is in accordance with theoretical considerations which indicate that the inductance device or interphase transformer 26 should function to produce commutation of the converted current in a manner similar to the condensers 15 and 16 of Fig. 1.

The curves of Fig. 4 are copies of oscillograms made during actual operation of the apparatus illustrated by Fig. 3. In this figure, curves 28' to 33' indicate the relation between the currents of the devices 28 to 33 respectively, curve 29'' indicates the voltages of device 29 at different successive instants of time, curve 41 is the sum of the curves 28' and 29', curve 42 indicates the voltage between two of the terminals 27, curve 43 indicates the current in one phase of the alternating current circuit, curve 44 indicates the current in the direct current circuit, curve 45 indicates the exciting current of the device 26 and curve 46 indicates the excitation voltage of this device.

As indicated by the curves 28' to 33', four of the devices 28 to 33 are transmitting current and two of these devices are idle at any instant of time. Thus the devices 28 and 31 are idle during time interval $t_1$—$t_2$, the devices 28 and 33 are idle during the interval $t_2$—$t_3$, the devices 30 and 33 are idle during the interval $t_3$—$t_4$, etc.

The current of each device flows during two thirds of a cycle or 240 electrical degrees. The device 29, for example, transmits current during the time interval $t_6$—$t_{10}$. During the interval $t_9$—$t_{10}$, the current of the device 29 flows also through the winding 34 and the device 28. At the instant $t_{10}$, the device 29 is subjected to a reverse or counter-voltage as indicated by the curve 29'' and its current is interrupted. Thereafter for 120 electrical degrees, the grid potential of the device 29 prevents starting of current through the device.

Assuming the apparatus to be operating as an inverter, the direction of current flow through its different parts during the time interval $t_6$—$t_7$ is indicated by arrows on Fig. 3. It will be observed that current flows from the positive direct current terminal 10 through the device 30, and the upper half of the winding 35 to the alternating load circuit. From the alternating current load circuit, this current returns to the negative direct current terminal 10 through the lower halves of the windings 34 and 36, and the devices 29 and 33. Also during time interval $t_6$—$t_7$, a small current flows between the direct current terminals 10 through the device 28, the winding 34 and the device 29 as indicated by the curve 28'. At the instant $t_7$, current starts through the device 32 and current of the device 28 is interrupted. The manner in which the load or converted current is shifted between the various devices is apparent from the curves 28' to 33'.

As indicated by the curve 41, the total current curve of each pair of tubes approximates a sine wave. The alternating current terminal and voltage curves 42 and 43 show that this wave form is rendered sinusoidal by the capacitators 40.

Like the converting apparatus illustrated by Fig. 1, the polyphase apparatus of Figs. 2 and 3 has the advantage of reliability, grid control, idle intervals long enough to permit deionization of the electric discharge devices between current carrying intervals, and immunity from arc back when utilized to transmit current from the alternating current circuit to the direct current circuit. It has the further advantage that the need of the commutating condensers is obviated when operating under unity power factor conditions, thus reducing the size and cost of the apparatus and permitting operation over an unrestricted range of frequencies. The outstanding feature of this circuit is the elimination of arc backs when used as a rectifier. It can be analytically demonstrated that whenever a valve with a negative potential starts becoming conductive by passing current in the opposite direction, the full magnetizing impedance of the interphase transformer opposes this negative current and keeps within the range of glow currents which is of the order of one milliampere, at the same time the D. C. voltage being shorted by this valve which has become conductive and the positive valve which has been passing current in the right direction will put out the positive tube.

By these two processes the potential on the negative tube will instantly become positive and the arc back is automatically prevented from starting, unlike the conventional circuit where the slightest inverse current builds up instantly into an arc back on account of the absence of impedance in its path.

Due to the polyphase relation of the windings 34, 35 and 36, there is substantially no direct current component in the flux of the core 37 and the alternating flux of this core is much smaller than in the case of the single phase inverter. The device 26, therefore, functions as an ordinary transformer and its core may be made smaller than in the case of the apparatus illustrated by Fig. 1.

Since four of the electric discharge valves are operating at any given time, four out of the six half-coil sections of the windings 34, 35 and 36 are active simultaneously and the device 26 operates very much like an auto transformer, each half-coil section acting as a capacitor during one part of the cycle and as an inductance during the other part of the cycle. The rating of the device 26 is therefore about 50% of the K. V. A. of the alternating current load. In the operation of the apparatus, it has been found desirable that the inductance per half-coil section of the windings 34, 35 and 36 be larger than twice that of one phase of the alternating current load.

Fig. 5 illustrates the application of protective means to the arrangement of Fig. 3. This protective means includes a capacitor 47 which is arranged to be charged from the direct current terminals 10 through electric discharge devices and to be discharged through the devices 29, 31 and 33 for the purpose of interrupting operation of the apparatus. The capacitor 47 is discharged at one side through a single path including the electric discharge device 50 and at the other side through three paths including respectively a device 51 and the device 29, a device 52 and the device 31, and a device 53 and the device 33. The devices 48 to 53, like the devices 28 to 33, are provided with grids or control electrodes.

The grid or control circuits of the devices 48 to 53 each include a pair of oppositely connected rectifying elements whereby the grid circuits may be subjected to opposed biasing potentials similar to the potentials of the source 24 and the resistor 23 of Fig. 1. Thus in the use of the device 48, for example, the grid circuit includes a rectifying element 54 which produces a bias potential of one polarity across a resistance 55 and a rectifying element 56 which produces a bias potential of opposed polarity across a resistor 57. Like arrangements are provided for controlling the operation of the devices 29, 31, 33 and 49 to 53. A switch 58 is provided for connecting the rectifying element 56 of each of these grid control arrangements to suitable alternating current buses 60 and a switch 59 is provided for connecting the rectifying elements 54 of these arrangements to similar alternating current buses 61.

Assuming the switch 59 to be closed, the devices 48 and 49 are subjected to positive grid bias potentials which permit them to transmit charging current from the terminals 10 to the condenser 47, and the devices 51 to 33 are subjected to negative grid bias potentials which precludes discharge of the capacitor 47. Under these conditions, the capacitor 47 is charged and the operation of the apparatus is as previously described.

Upon closure of the switch 58, the bias potentials of the devices 48 to 53 neutralize one another and the charge and discharge paths of the capacitor 47 are closed.

The buses 61 are preferably connected to one phase of the alternating terminals 27 of the apparatus. Under these conditions, decrease in the voltage of these terminals will cause a resultant positive grid bias potential to be applied to the devices 50 to 53, thus permitting discharge of the capacitor 47 through the devices 29, 31 and 33 and interrupting the current of these devices. At the same time, a resultant negative grid bias potential is applied through the corresponding rectifying elements 54 to the devices 29, 31 and 33 and resumption of operation of the apparatus is prevented until normal operating conditions have been restored. As will be readily understood, the rectifying elements 54 and 56 may be of the copper oxide or any other suitable type.

What I claim as new and desire to secure by Letters Patent of the United States is:

1. The combination of a plurality of pairs of electric discharge devices, a reactance device including a plurality of windings, a pair of direct current terminals interconnected through a plurality of paths each including one of said pairs and one of said windings and a plurality of alternating terminals each connected to a different one of said windings at a point intermediate its ends.

2. The combination of a plurality of pairs of electric discharge devices, a reactance device including a plurality of windings, a pair of direct current terminals interconnected through a plurality of paths each including one of said pairs and one of said windings, a plurality of alternating terminals each connected to a different one of said windings at a point intermediate its ends, and capacitor means connected between said alternating current terminals.

3. The combination of a plurality of pairs of electric discharge devices, a reactance device including a plurality of windings, a pair of direct current terminals interconnected through a plurality of paths each including one of said pairs and one of said windings, a plurality of alternating terminals each connected to a different one of said windings at a point intermediate its ends, and grid control means for predetermining the instants at which current starts through each of said devices.

4. The combination of a plurality of pairs of electric discharge devices, a reactance device including a plurality of windings, a pair of direct current terminals interconnected through a plurality of paths each including one of said pairs and one of said windings, and a plurality of polyphase terminals each connected to a different one of said windings at a point intermediate its ends.

5. The combination of a plurality of pairs of electric discharge devices, a reactance device including a plurality of windings each wound on a different core leg, a pair of direct current terminals interconnected through a plurality of paths each including one of said windings and one of said pairs, and polyphase terminals each connected to a different one of said windings at a point intermediate its ends, whereby the current flowing between said terminals is successively shifted from one to another of said devices.

6. The combination of a plurality of pairs of electric discharge devices, a reactance device including a plurality of windings each wound on a different core leg, a pair of direct current terminals interconnected through a plurality of paths each including one of said windings and one of said pairs for causing the current flowing between said terminals to be successively shifted from one to another of said devices, polyphase terminals each connected to a different one of said windings at a point intermediate its ends, and grid control means for predetermining the instants at which the currents of said devices are reestablished.

7. The combination of a pair of direct current terminals, a pair of electric valves provided with control grids and an inductive winding serially connected between said terminals, an alternating current circuit interconnected with said terminals through said winding and valves, and a grid circuit for one of said valves including a source of negative bias potential tending to render said valve nonconductive and a source of positive bias potential variable in response to variations in an electrical condition of said alternating current circuit for normally overcoming said first mentioned bias.

8. The combination of a pair of direct current terminals, a pair of electric valves provided with control grids and an inductive winding serially connected between said terminals, an alternating current circuit interconnected with said terminals through said winding and valves, a grid circuit for one of said valves including a source of negative bias potential and a resistor, and means for producing a potential drop in said resistor opposing said negative bias and variable in accordance with the voltage of said alternating current circuit.

9. The combination of a pair of electric discharge devices, an inductance device including a winding, a pair of direct current terminals interconnected through a path including said pair of electric discharge devices and said winding, an alternating current circuit including said winding, grid control means operable in response to a predetermined electrical condition of said alternating current circuit, and capacitor means arranged to be discharged through one of said devices in response to change in the condition of said grid control means for interrupting the path between said direct current terminals.

In witness whereof, I have hereunto set my hand this 21st day of February, 1930.

CAMIL A. SABBAH.